United States Patent [19]

Donaldson et al.

[11] 4,032,327

[45] June 28, 1977

[54] PYROMETALLURGICAL RECOVERY OF COPPER FROM SLAG MATERIAL

[75] Inventors: John W. Donaldson; Sheree N. Sharma, both of Salt Lake City, Utah; Nicholas John Themelis, Stamford, Conn.

[73] Assignee: Kennecott Copper Corporation, New York, N.Y.

[22] Filed: Aug. 13, 1975

[21] Appl. No.: 604,123

[52] U.S. Cl. .................................... 75/72; 75/24; 75/76
[51] Int. Cl.² .................. C22B 15/00; C21B 3/04
[58] Field of Search ............. 75/76, 74, 72, 23, 24, 75/92

[56] References Cited

UNITED STATES PATENTS

| | | | |
|---|---|---|---|
| 1,822,588 | 9/1931 | Fowler et al. | 75/72 |
| 2,035,016 | 3/1936 | Simcox et al. | 75/24 |
| 2,295,219 | 9/1942 | Kalling et al. | 75/24 |
| 3,432,289 | 3/1969 | Spitz et al. | 75/76 |
| 3,506,435 | 4/1970 | Themelis et al. | 75/24 |
| 3,615,361 | 10/1971 | Queneau et al. | 75/73 |
| 3,666,440 | 5/1972 | Kono et al. | 75/76 |
| 3,682,623 | 8/1972 | Dierckx et al. | 75/76 |

*Primary Examiner*—Walter R. Satterfield
*Attorney, Agent, or Firm*—Mallinckrodt & Mallinckrodt

[57] ABSTRACT

A cyclic, two-stage process is disclosed for pyrometallurgical recovery of copper as a high-grade matte from molten slag material containing both dissolved and/or entrained copper values. A charge of the copper-bearing slag material is treated in the first stage of the process with a hydrocarbonaceous or hydrogenous reductant in a rotary furnace, such as a top-blown rotary reactor, rotating at at least about 10 rpm, to form a high-grade copper matte phase and a slag phase of reduced copper content. The rotation of the reactor is discontinued and the high-grade copper matte phase separates from the slag phase and is recovered from the reactor. The reactor containing the remaining slag of reduced copper content is again rotated at about 10 rpm, and iron sulfide, e.g. pyrite, is added in the second stage of the process to the slag in the rotating reactor to provide a low-grade matte phase which literally "washes out" most of the remaining copper contained in the slag. The rotation of the reactor is again discontinued and the low-grade matte phase separates from the remaining slag phase. The remaining slag phase is removed from the reactor, and the low-grade matte produced in the second stage is left in the reactor to mix with an additional charge of slag material in a subsequent cycle of the process.

6 Claims, 1 Drawing Figure

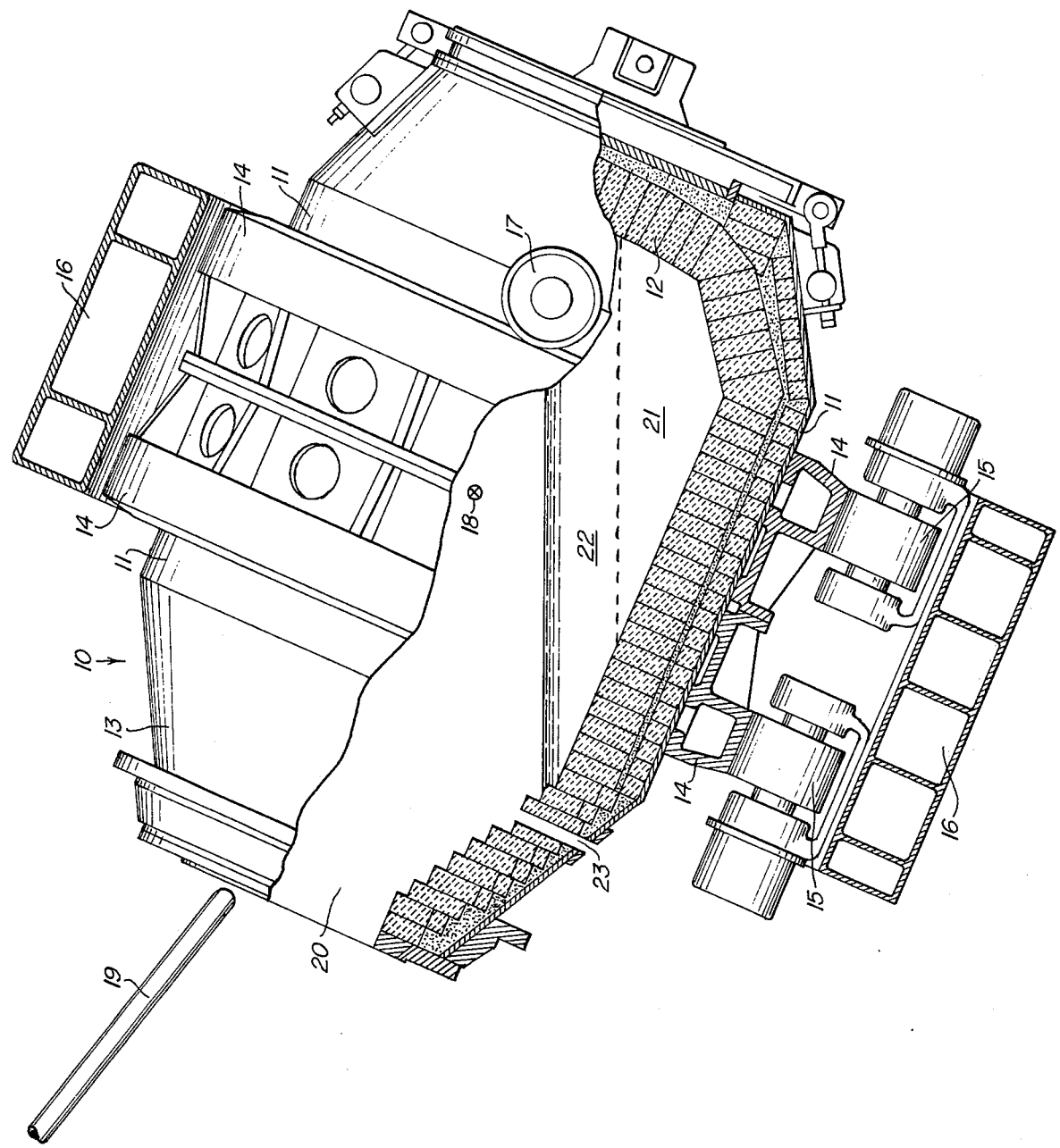

PYROMETALLURGICAL RECOVERY OF COPPER FROM SLAG MATERIAL

BACKGROUND OF THE INVENTION

1. Field

The present invention is directed to pyrometallurgical recovery of copper from copper-bearing slags produced in the smelting and refining of copper ores.

2. State of the Art

The extraction of copper from copper ores by pyrometallurgical methods is a very old art, and the losses of copper in slags produced in pyrometallurgical extraction methods has been extensively investigated. It has generally been recognized that copper losses in slags result from copper values dissolved in the slag as well as from copper values mechanically entrained in the slag. Of the total losses of copper in slags, it has been reported that over 70% result from copper values dissolved in the slag, with the remaining losses resulting from metallic copper or copper matte mechanically entrained or suspended in the slag. Mechanically entrained or suspended copper appears in slag as globules in the size range of from about 5 to 100 microns, and for all practical purposes, these globules will not settle out.

A process is disclosed in U.S. Pat. No. 3,682,623 for recovering copper, as black copper, from slags containing copper values. The copper-bearing slags are mixed in the molten state with metallic iron and the melt is subjected to a high degree of agitation, thereby selectively reducing combined copper in the slag to elemental copper. The agitation is produced by rotation of the furnace containing the melt. The metallic copper, e.g. black copper, is then separated from the slag phase.

Copper losses in slags and proposed methods of recovering the copper values from such slags are discussed in an article entitled "The Cleaning of Slags in a Tubular Rotary Furnace", published in Tsvetnye Metally 36(9) date 1963. The authors suggest that, in conventional furnaces wherein a high degree of agitation of the molten contents is not obtained, the interaction between the matte phase and slag phase proceeds at slow rates, being restricted by diffusion of reactants to the interface between the two phases. It was found that intimate mixing of the matte and slag phases improved diffusion of reactants between the phases and accelerated the process of matte drop coagulation. Reverberatory copper slag containing 0.35% copper was treated with sulfidizing agent in a rotary furnace rotating at 5 rpm. After two hours, the molten mass was discharged from the furnace, and the matte and slag phases separated. The slag phase was found to contain 0.1% copper when CaS in an amount of 10% by weight of the slag was used as the sulfidizing agent, and 0.11% copper when $FeS_2$ in an amount of 15% by weight of the slag was used as the sulfidizing agent.

Processes for pyrometallugically refining copper mattes using a rotary reactor are disclosed in various U.S. Pat. Nos. 3,615,361; 3,615,362; and Re 27,548.

SUMMARY OF THE INVENTION

In accordance with the present invention, molten slag containing from about 1 to 10 percent by weight of copper in the form of dissolved and/or entrained copper values is subjected to a two-stage cleaning process in a rotary furnace, such as a top-blown rotary reactor. In the first stage, carbonaceous or hydrogenous reductants are added to the molten slag in the reactor, and the reactor is rotated at about 10 rpm or greater for a period of about 30 minutes or less. The reductants react with magnetite and copper oxide in the slag, thereby lowering the oxygen content of the slag, and a high-grade copper matte is formed. The first stage of the process is completed by discontinuing the rotation of the reactor, whereupon a high-grade matte separates rapidly from the slag phase, and is subsequently removed from the reactor.

In the second stage, iron sulfide, e.g. pyrite, is added to the molten slag remaining in the rotary reactor to provide a low-grade matte phase separate from the slag phase. The low-grade matte and slag phases are intimately mixed by rotating the reactor at about 10 rpm or greater for a period of about 60 minutes or less. The low-grade matte phase literally "washes" copper sulfide from the slag. Any metallic copper suspended in the slag is converted to copper sulfide and is also "washed" from the slag by the low-grade matte phase. Rotation of the reactor is then discontinued, and the low-grade matte phase rapidly separates from the extracted slag phase. The slag phase is skimmed from the reactor and discarded. The low-grade matte can be removed from the reactor for further treatment outside the scope of the present invention, but it is preferred that it be left to mix with the next batch of copper-containing slag which is to be extracted.

The copper content of slags originally containing about 5 percent to 15 percent copper can be reduced to about 1 percent copper during the first stage treatment, and a high-grade copper matte is recovered which has a CuS content of between about 70 percent and 80 percent or greater. The amount of iron sulfides present during the first stage of the process should be restricted even though they are capable of reducing both magnetite and copper oxide in the slag. Addition of iron sulfide during the first stage lowers the grade of matte which is recovered, and if iron sulfide is added in amounts necessary to effectively reduce the magnetite and copper oxide contents of the slag, a low-grade matte is produced together with an increased amount of slag in which copper values can become entrained.

Relatively small amounts of iron sulfide can be tolerated in the first stage, and as mentioned above, it has been found advantageous to leave the low-grade matte which is produced during the second stage of the process in the reactor to mix with the next batch of slag which is to be treated. Generally, the amount of low-grade matte produced in the second stage of the process is small in comparison to the amount of slag being treated in the first stage. For example, for every 100 pounds of slag initially being treated, there is only about 1 to 10 pounds of low-grade matte produced during the second stage of the present process. Recovery of the copper values from this low-grade matte has been found to be both economically and technologically feasible by recirculating the low-grade matte to the first stage of the process.

THE DRAWING

The single FIGURE of the drawing is a side elevation of one form of a rotary reactor useful in the present invention, a portion of the reactor walls having been broken away to show the internal configuration.

DETAILED DESCRIPTION OF THE BEST MODE CONTEMPLATED

In accordance with the present invention, copper is extracted pyrometallurgically from slag material containing dissolved and/or entrained copper values. The slag material, containing from about 1 to 10 percent by weight of copper, either dissolved or entrained therein, is melted in a rotary reactor and subjected to a two-stage cleaning process. In the first stage, carbonaceous or hydrogenous reductants are added to the melt in the rotating reactor, and the reactor is rotated at from about 10 rpm to 40 rpm or greater for a period of about 30 minutes or less.

The reductants react with magnetite ($Fe_3O_4$) and copper oxide ($Cu_2O$) in the slag. When using coke or carbon as a reductant, the reduction of magnetite in the slag proceeds according to several separate reaction mechanisms. Magnetite is usually present in the slag in amounts in excess of the equilibrium solubility thereof in the slag. The reduction of the solid magnetite, i.e. that which is not in solution in the slag, is accomplished according to the following reactions:

$$2Fe_3O_{4(s)} + C_{(s)} \rightarrow 6FeO_{(l)} + CO_{2(g)} \quad (1)$$
$$Fe_3O_{4(s)} + C_{(s)} \rightarrow 3FeO_{(l)} + CO_{(g)} \quad (2)$$

The reduction of the remaining magnetite, i.e. that dissolved in the slag, is accomplished according to the following reactions:

$$2Fe_3O_{4(l)} + C_{(s)} + 3SiO_{2(l)} \rightarrow 3Fe_2SiO_{4(l)} + CO_{2(g)} \quad (3)$$
$$2Fe_3O_4 + 2C_{(s)} + 3SiO_{2(l)} \rightarrow 3Fe_2SiO_{4(l)} + CO_{(g)} \quad (4)$$

Copper oxide reacts with the carbon reductant according to the equation:

$$4Cu_2O_{(l)} + C_{(s)} \rightarrow 4Cu_{(l)} + CO_{2(g)} \quad (5)$$

The copper content of the slag has been found to vary with the magnetite content. By reducing the magnetite content to about 13 percent or less, the copper content of the slag can be reduced to about 1 percent or less. The copper is recovered as high-grade matte that rapidly separates from the slag. Any copper oxide contained in the slag is reduced to metallic copper and is recovered in the high-grade matte. If a relatively small amount of iron sulfide, particularly pyrite, is present in the slag during the first stage treatment, the metallic copper resulting from the reduction of copper oxide is advantageously converted to copper sulfide, which is more soluble in the high-grade matte than is metallic copper. As was mentioned hereinbefore and will be further discussed hereinafter, the amount of iron sulfide present during the first stage treatment should be restricted to no greater than from 1 to about 5 percent of the slag being treated.

The reaction kinetics have been found to be very rapid when a hydrogenous or carbonaceous reductant is reacted with the slag in a rotating reactor. Reduction of copper oxide and magnetite can be obtained in thirty minutes or less. In addition, the stoichiometry of the system is almost ideal, that is, large excesses of reductant over that actually needed for reaction with the copper oxide and magnetite in the slag are not necessary, as is the case when iron sulfides are used as the reductant.

As the rotary reactor revolves, the melted slag tends to be drawn up on the ascending wall of the reactor and cascades back down in the manner of a waterfall. In addition, a thin layer of molten slag adheres to the portion of the reactor wall which is not submerged. The combination of these two effects in a significant increase in the exposure of the melt to gases within the converter when gaseous reductants, such as hydrogen gas, are being used.

As the wall of the rotating reactor descends into the molten slag bath, cavitation occurs and solid reductants, such as coke fines, drift towards the cavitation line and are drawn into the molten bath. This phenomenon overcomes the tendency of coke to float on the surface of the molten slag bath which drastically reduces the rate of reaction between the coke and the magnetite and copper oxide in the slag. The reaction with submerged coke is effective and rapid.

At the end of the first stage treatment, the rotation of the reactor is discontinued and the high-grade copper matte phase rapidly separates from the slag phase. The high-grade copper matte is recovered from the reactor, and the slag phase remaining in the reactor is then subjected to a second stage treatment to further recover copper values therefrom.

The second stage treatment comprises adding a small amount of iron sulfide, such as pyrite, to the molten slag to provide a low-grade matte phase, and the reactor is then rotated at about 10 rpm to 40 rpm or greater for a period of about 15 minutes or less, thereby intimately contacting the slag phase with the low-grade matte phase.

At the beginning of the second stage of the process, the slag phase contains about 1 to 2 percent copper, the majority of which is present as small droplets of copper sulfide and metallic copper suspended in the molten slag phase. During the second stage treatment, any metallic copper which is present in the slag reacts with pyrite in the low-grade matte to form copper sulfide according to the reaction:

$$2Cu_{(l)} + FeS_{2(l)} \rightarrow Cu_2S + FeS \quad (6)$$

and the low-grade matte phase literally "washes" the copper sulfide whether present intially or produced by reaction (5) from the molten slag.

When rotation of the reactor is stopped, and low-grade matte phase rapidly separates from the slag phase, and the slag phase is removed from the reactor and discarded. The copper content of the discarded slag phase is generally between about 0.3 to 0.5 percent, depending upon the copper content of the low-grade matte which is produced during the second stage. If the resulting low-grade matte contains from about 20 to 25 percent copper, the copper content of the slag can be reduced to about 0.3 percent. However, if the low-grade matte contains up to 35% copper, the discarded slag will contain about 0.5 percent copper.

Thus, it can be seen that the high-grade matte resulting from the first stage treatment must be separated and removed from the slag phase prior to the second stage treatment. Otherwise, a large amount of iron sulfide must be added to the high-grade matte for the matte to be effective in "washing" copper sulfides from the slag in the second stage. For example, following the first stage treatment of 100 tons of slag containing 10 percent copper, the reactor would contain about 86 tons of slag and about 11 tons of copper matte containing about 80 percent copper. Addition of about 14 tons of iron sulfides would be required to reduce the copper content of the matte to about 35 percent. Even more iron sulfide would be required to reduce the matte to 20 percent copper. The net result would be the recovery of about 25 tons of low-grade matte, whereas the present invention results in the same degree of recovery of copper from the slag as a high-grade matte.

After removing the impoverished slag from the reactor at the end of the second stage of the present process, a relatively small amount of low-grade matte remains. This matte can be removed from the reactor for further processing outside the scope of this invention. However, it has been found preferable to leave the low-grade matte in the reactor to mix with the next batch of slag which is to be processed.

On the basis of treating successive batches of about 100 tons of slag each there would be about 1 to 5 tons of low-grade matte remaining in the reactor at the end of each batch cycle. This low-grade matte, containing from about 1 to 4 tons of iron sulfide, is mixed with the next successive batch of slag. As noted hereinbefore, the amount of iron sulfides present during the first stage of the present process should be restricted. However, it has been found that the amount of iron sulfides introduced by mixing each new batch of slag with the low-grade matte remaining from cleaning the prior batch of slag is feasible, and, in fact, provides an economic means for recovering the copper contained in the low-grade matte.

The amount of iron sulfides introduced into the first stage of the process by the low-grade matte is much less than that which would be required if the iron sulfides were being utilized as the reductant in the first stage of the process. When a batch of slag (100 tons) containing about 10 percent copper is subjected to the first stage of the present process, without the adding of any iron sulfides thereto, approximately 11 tons of matte containing 80 percent copper is recovered. If iron sulfides were utilized as the reductant in the first stage in place of the hydrogenous or carbonaceous reductant, the grade of the recovered matte would be drastically affected due to the large excess of iron sulfides required. Instead of recovering 11 tons of matte containing 80 percent copper, at least twice that amount of a matte containing less than 40 percent copper would be recovered.

Some iron sulfide additions can be tolerated when a hydrogenous or carbonaceous reductant is utilized according to the present invention. For example, when up to 5 tons of low-grade matte, such as produced during the second stage of the process, are added to the 100 tons of slag in the first stage of the process, about 16 tons of high-grade matte containing at least about 60 percent copper is produced. Normally, the amount of low-grade matte to be recycled from the second stage to the first stage of the process will be closer to 3 tons than to 5 tons. In such instances, about 13 tons of high-grade matte containing at least about 72 percent copper is obtained.

If the slag to be treated contains copper oxide, the small amount of iron sulfides added thereto as a result of recycling the low-grade matte from the second stage is actually beneficial in the present process. If the slag contains about 5 percent copper oxide and 5 percent copper sulfide, as do many slags from processes for continuous converting of copper matte, the copper oxide is converted to metallic copper according to equation (5). The pyrite contained in the low-grade matte which is recycled and mixed with the slag being treated reacts with the metallic copper according to equation (6). The copper sulfide so produced is more readily extracted from the slag in the resulting high-grade matte phase than is metallic copper, and the resulting high-grade matte contains at least about 75 percent copper.

The reactor used in the present process is preferably a topblown, rotary reactor as developed and used in the Kaldo process for producing steel. A side view of such a reactor is shown in the drawing. The reactor comprises a vessel 10 having a cylindrical wall 11, a generally circular end wall 12, and an opposite, open, frustoconical end 13. The vessel is preferably fabricated from steel plate and is lined with refractory brick, as shown. It has steel track rings 14 positioned around cylindrical wall 11 for riding on motor driven, support rollers 15. These support rollers 15 are mounted on annular frame 16, which circumscribes cylindrical wall 11 of the vessel. Thrust rollers 17 are mounted on frame 16 so as to engage the side of the track ring 14 nearest end wall 12 of the vessel.

Vessel 10 is rotatable about its cylindrical axis, with the motor-driven support rollers 15 providing the means for rotating it. Frame 16 can be tiled about a horizontal pivot axis 18, so vessel 10 can be tilted to a small angle below and above the horizontal.

Means are provided for heating the reactor and contents thereof. As shown, a fuel burner 19 is positioned near the open mouth 20 of vessel 10, so as to provide for combustion of liquid or finely divided solid fuel in the vessel 10 above the level of material therein. During operation, the rotary reactor is inclined at about 15° to 20° to the horizontal, with its open end uppermost. Speed of rotation is as found convenient, from about 10 rpm up to about 40 rpm.

At the conclusion of the first stage of the process, rotation of the reactor is stopped and a high-grade matte phase 21 rapidly separates from a supernatant slag phase 22. The high-grade matte 21 is recovered, leaving the slag phase 22 in the vessel for further treatment in the second stage of the process.

The high-grade matte 21 can be recovered from the reactor vessel 10 in several ways. Thus, the vessel 10 can be tilted so that its open end 20 faces downwardly, allowing the slag 22 to be poured into a holding ladle (not shown). The matte 21 is then poured into a recovery vessel, and the slag in the holding ladle is returned to the reactor vessel 10.

Transferring the slag to a holding ladle can be avoided by providing the reactor vessel 10 with means for undertapping the matte layer 20. As shown, a normally plugged taphole 23 is located in the frustoconical section 13 of the vessel 10 so as not to be submerged by the molten bath during normal rotation of the vessel. When the matte 21 is to be undertapped, the open end of the vessel 10 is tilted downwardly until the taphole 23 is covered by matte. If found necessary, a refractory dam can be built up in the vessel about the open mouth 20 to prevent molten slag from pouring out. The refractory material plugging the taphole is then removed and the matte 21 is drained from under the slag. Following removal of the matte 21, taphole 23 is again plugged, and the vessel 10, containing only the slag 22, is returned to its normal operating position.

Although not shown in the drawing, the reactor vessel 10 could also be provided with a sliding gate or other mechanical valve to eliminate the necessity of removing the slag phase from the vessel at the end of the first stage of the process. Such sliding gate or other mechanical valve would preferably be positioned in the cylindrical wall 11 of the vessel 10 near end wall 12. Sliding gate valves have been used extensively in the steel industry to empty ladles and other similar vessels. In use, the vessel 10 would be rotated until the sliding gate or other mechanical valve is at its lowest position. The valve would then be opened to undertap the matte phase 21 from the vessel 10 and closed thereafter to leave the slag phase 22 in the vessel 10 for further treatment.

The carbonaceous reductants which may be utilized in the present process include coal, coke, carbonaceous wood by-products, charcoal, and petroleum coke.

The reactions occurring during the process are endothermic, and heat is lost to the atmosphere and to equipment around the reactor. Heat must, therefore, be supplied to the molten bath in the reactor to maintain such bath at desired operating temperature. Such heat is preferably supplied to the molten bath by a gas burner 19 directed so as to maintain a flame over the bath in the reactor vessel. The flame should be maintained in such manner as to establish a neutral to reducing atmosphere in the reactor.

A rotary reactor test unit was constructed from a portable concrete mixer. The concrete mixing vessel had the shape of a truncated cone with a base diameter of 26 inches, a depth of 25 inches, and an opening or mouth diameter of 20 inches. The inside of the vessel was lined with a magnesia-chrome ore refractory material. The resulting apparatus was very similar to the reactor shown in the attached drawing, except that no taphole was provided in the sidewall of the vessel.

The drive mechanism of the portable concrete mixer was altered so that the refractory-lined vessel could be rotated at rotational speeds up to 39 rpm. A natural gas burner, capable of providing a neutral to reducing flame, was situated so as to direct the flame into the mouth of the refractory-lined vessel. The burner was capable of providing a maximum heating rate of 2 million Btu per hour.

The results from numerous test, wherein crushed converter slag was treated in the test unit, indicate that slag containing from 5 percent to 15 percent copper can be reduced to about 1 percent during the first stage of the present process and then further reduced to about 0.3 to 0.5 percent during the second stage of the process. The process was found to be effective in recovering copper from slags wherein the copper is presently in either the metallic state, as copper oxide, as copper sulfide, or as mixtures thereof.

In all the tests, silica was added to the slag in the first stage of the process to provide an overall $Fe/SiO_2$ ratio of about 1.75 to 2. It was found that the magnetite content of slags that initially contained up to 40 percent magnetite could be reduced to less than 13 to 15 percent in 20 to 25 minutes or less, with a corresponding decrease in the copper content of the slag phase to about 1 percent.

The reductant used in the tests was petroleum coke. The melt became far more fluid after the coke addition and boiled visibly as carbon monoxide and dioxide gases were released from the bath.

It was found advantageous to add small amounts of pyrite to the slag during the first stage of the process. The pyrite advantageously reacts with metallic copper in the slag, coverting same to copper sulfide, which migrates to the slag phase faster and to a greater extent than does metallic copper. As explained hereinbefore, the amounts of iron sulfide added to the slag in the first stage of the process should be limited to no greater than about 5 percent of the slag being treated. Recycling the low-grade matte produced in the second stage of the process was found to be an advantageous means of recovering the copper values contained therein as well as of adding an acceptable amount of pyrite to the slag in the first stage of the process.

Reference herein to details of the presently preferred embodiments is not intended to limit the scope of the claims. Many modifications will become apparent to those skilled in the art without departing from the inventive subject matter described and claimed herein.

What we claim is:

1. A cyclic, two-stage process for recovering essentially all copper values present in molten slag, comprising: (a) subjecting a charge of the molten slag to vigorous agitation in a rotary reactor rotating at a speed of at least about 10 rpm; (b) adding a carbonaceous or hydrogenous reductant to said charge of molten slag in the rotating reactor to reduce magnetite and to produce a high-grade matte, containing at least about 70% copper, and a slag; (c) discontinuing rotation of the reactor, thereby allowing the high-grade matte to separate from the slag, whereby a matte phase and a slag phase are produced from the original charge; (d) recovering the high-grade matte phase from the reactor; (e) subjecting the molten slag phase that remains after the high-grade matte phase has been separated therefrom to vigorous agitation by again rotating the reactor at a speed of at least about 10 rpm; (f) adding an iron sulfide to the molten slag in the reactor, to provide a low-grade copper matte containing from about 20% to about 35% copper and a slag containing from about 0.3% to 0.5% copper, said low-grade matte and slag being intimately mixed by vigorous agitation as the reactor rotates, thereby extracting copper values from the slag; (g) again discontinuing rotation of the reactor, thereby allowing the low-grade copper matte to settle and to separate from the slag, whereby a matte phase are produced from the slag phase of step (c); (h) removing the slag phase of step (g) from the reactor, leaving the low-grade copper matte phase in the reactor; (i) introducing an additional charge of the molten slag into the reactor for mixing with the low-grade copper matte remaining therein from step (h); and repeating steps (a) through (i) on a cyclic basis.

2. A process in accordance with claim 1, wherein a flame is maintained in the rotating reactor in such manner as to establish a neutral to reducing atmosphere in the reactor.

3. A process in accordance with claim 1, wherein the matte is recovered from the reactor in step (d) by first skimming the slag phase into a ladle for temporary holding, removing the high-grade matte from the reactor, and then returning the slag phase from the ladle to the reactor.

4. A process in accordance with claim 3, wherein the slag phase is separated from the low-grade matte phase in step (h) by skimming the slag phase from the reactor.

5. A process in accordance with claim 1, wherein the matte is recovered from the reactor in step (d) by undertapping the matte, leaving the slag phase in the furnace.

6. A process in accordance with claim 5, wherein the slag phase is separated from the low-grade matte phase in step (h) by skimming the slag phase from the reactor.

\* \* \* \* \*